United States Patent
Tomas et al.

(10) Patent No.: US 9,846,469 B2
(45) Date of Patent: *Dec. 19, 2017

(54) FAULT TOLERANT POWER SUPPLY INCORPORATING INTELLIGENT LOAD SWITCH TO PROVIDE UNINTERRUPTED POWER

(71) Applicant: Alpha and Omega Semiconductor Incorporated, Sunnyvale, CA (US)

(72) Inventors: Mark Tomas, San Mateo, CA (US); Zhiye Zhang, San Jose, CA (US); Allen Chang, Fremont, CA (US); Kuang Ming Chang, Fremont, CA (US); Gilbert Lee, Seoul (KR); Son Tran, San Jose, CA (US)

(73) Assignee: Alpha and Omega Semiconductor Incorporated, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/155,911

(22) Filed: May 16, 2016

(65) Prior Publication Data

US 2016/0259390 A1 Sep. 8, 2016

Related U.S. Application Data

(63) Continuation of application No. 13/950,159, filed on Jul. 24, 2013, now Pat. No. 9,367,111.

(Continued)

(51) Int. Cl.
*G06F 19/00* (2011.01)
*G06F 1/30* (2006.01)
(Continued)

(52) U.S. Cl.
CPC .............. *G06F 1/305* (2013.01); *G06F 1/28* (2013.01); *G06F 1/30* (2013.01); *H02J 9/061* (2013.01)

(58) Field of Classification Search
CPC combination set(s) only.
See application file for complete search history.

(56) References Cited

U.S. PATENT DOCUMENTS 6,031,743 A * 2/2000 Carpenter ............... H02J 1/102
307/48
9,112,422 B1 * 8/2015 Vinciarelli ........ H02M 3/33507
(Continued)

FOREIGN PATENT DOCUMENTS

CN 102570400 7/2012

OTHER PUBLICATIONS

Tyster et al., High-Speed gate drive scheme for three phase inverter with twenty nanosecond minmum gate drive pulse, 2009, IEEE, p. 1-4.*

*Primary Examiner* — Kidest Bahta
(74) *Attorney, Agent, or Firm* — Innovation Counsel LLP

(57) ABSTRACT

A fault tolerant power supply system includes at least one load switch circuit configured to connect, using a main switch, an input voltage to an output node of the load switch circuit when the load switch circuit is turned on and at least one power channel coupled to the load switch circuit to receive the input voltage. The power channel is configured as a buck converter and includes at least a high-side power switch and a low-side power switch. The fault tolerant power supply system is configured to measure a current flowing through the main switch of the load switch circuit, to determine that the current flowing through the main switch of the load switch circuit has exceeded a current limit threshold, and to disable the main switch of the load switch circuit and the low-side power switch of the power channel in response to the determination that the current flowing in the main switch has exceeded the current limit threshold.

11 Claims, 7 Drawing Sheets

Related U.S. Application Data

(60) Provisional application No. 61/778,133, filed on Mar. 12, 2013.

(51) Int. Cl.
*H02J 9/06* (2006.01)
*G06F 1/28* (2006.01)

(56) References Cited

U.S. PATENT DOCUMENTS

| | | | | |
|---|---|---|---|---|
| 2004/0051383 A1* | 3/2004 | Clark, Jr. | .................. | H02J 1/10 307/36 |
| 2005/0275393 A1* | 12/2005 | Knoedgen | ............. | H02M 3/156 323/284 |
| 2008/0297957 A1* | 12/2008 | Mehas | .................... | H02M 1/32 361/18 |

* cited by examiner

FAULT TOLERANT POWER SUPPLY INCORPORATING INTELLIGENT LOAD SWITCH TO PROVIDE UNINTERRUPTED POWER

CROSS REFERENCE TO OTHER APPLICATIONS

This application is a continuation of U.S. application Ser. No. 13/950,159, entitled FAULT TOLERANT POWER SUPPLY INCORPORATING INTELLIGENT LOAD SWITCH TO PROVIDE UNINTERRUPTED POWER, filed Jul. 24, 2013, now U.S. Pat. No. 9,367,111, issued Jun. 14, 2016, which claims priority to U.S. Provisional Patent Application No. 61/778,133, entitled FAULT TOLERANT POWER SUPPLY INCORPORATING INTELLIGENT LOAD SWITCH TO PROVIDE UNINTERRUPTED POWER, filed Mar. 12, 2013, both of which are incorporated herein by reference for all purposes.

BACKGROUND OF THE INVENTION

Many electronic systems, such as servers or microservers, require a reliable and uninterrupted source of power. In a power supply system providing uninterrupted power supply, backup or redundant power supplies are mounted in parallel with the main power bus line. FIG. 1 illustrates a conventional power supply system where a redundant power supply is coupled in parallel to the main power supply line. Referring to FIG. 1, a power supply system 1 includes a main power supply line 2 and a redundant power supply 3. The redundant power supply 3 is usually mounted in parallel using an OR'ing method, denoted by OR'ing circuit 4. The backup power supply 3 remains dormant and on standby mode for the most part of its existence and is only in operation when the main line 2 experiences an unscheduled downtime or when maintenance services are performed. The purpose of the redundant supply 3 is to immediately turn on in the event that the main power line 2 experiences fault, hence, providing uninterrupted operation or service to the end user. Typically, the redundancy power line 3 has the ability to flag or notify the system that it has been enabled, thus allowing for maintenance or service to the main line 2 at a more convenient time.

Mounting the redundant power supply in parallel to the main line by means of OR'ing can be done by the conventional diode method, which provides a blocking mechanism when there are no fault conditions. However, during a fault condition, the drop across the diode can result in significant power loss, especially when the power system is operating at a high current level, such as the current level often required by micro-servers and other hardware in telecommunication applications, which can be well above 80A.

The OR'ing of the redundant power supply can also be done by using a MOSFET switch with very low ON-state resistance. Using a MOSFET switch for the OR circuit will require good control and sense circuitry that is governed by accurate timing and sequencing. The MOSFET OR'ing scheme provides lower power loss and improves efficiency during "backup" events but can be disadvantageous during the unlikely event that the secondary (redundant) line's input voltage fails and drops, causing reversal of current since the MOSFET switch allows for bi-directional conduction. MOSFET switch in series with back to back body diodes can be an option to prevent reverse current flow from occurring but will require timing circuitry for accurate sequencing.

The redundant power supply and the OR'ing circuit increases system cost in addition to consuming real estate space, the cost and space being used for a redundant system that is primarily inactive. Data centers and telecommunication infrastructure applications strive for lower server profile, tighter rack space, higher power density designs and lower cost. The requirement to include a redundant line increases the complexity of the power supply system as an intelligent controller for the fault detect circuits, current sensing capability for current limiting, current reversal detectors, break before make housekeeping circuits for accurate timing and other aforementioned circuits accessories need to be incorporated in the redundant power supply system. The complexity of the redundant power supply increases system cost and takes up valuable PC board real estate.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, a fault tolerant power supply system incorporates an intelligent load switch circuit with current detection to detect and decouple a problematic power channel from the power supply system so that the power supply system can continue to operate to provide uninterrupted power to the output. In some embodiments, the intelligent load switch circuit detects for a surge current at the load switch and when a current exceeding a given threshold is detected, the load switch is turned off to discontinue the supply of input power to the problematic power channel. Meanwhile, the remaining power channels of the power supply system continue to operate to generate the output voltage. The multi-phase controller of the power supply system monitors the output voltage and may adjust its power supply operation using the remaining functional power channels.

Figure 1:
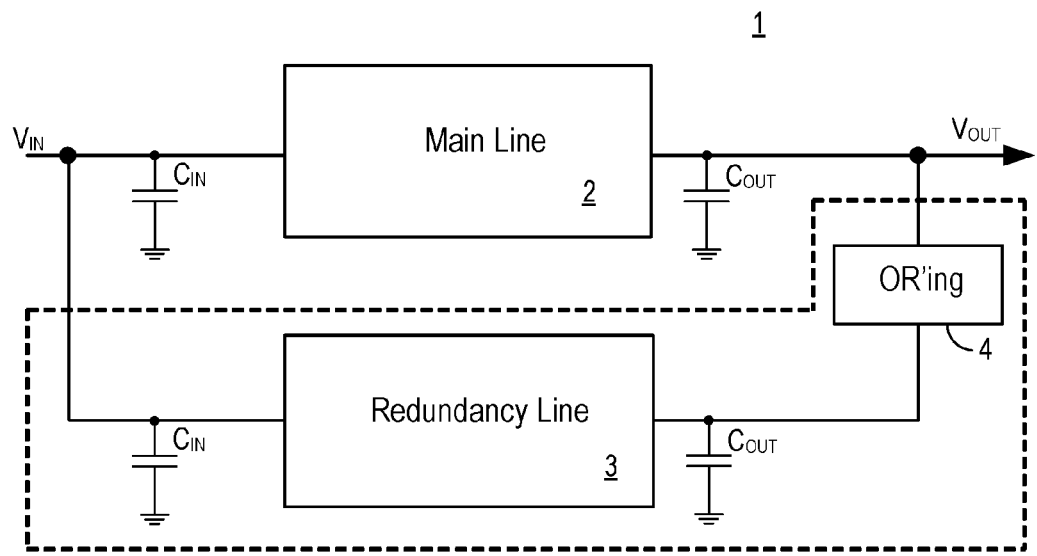
FIG. 1 illustrates a conventional power supply system where a redundant power supply is coupled in parallel to the main power supply line.
Figure 2:
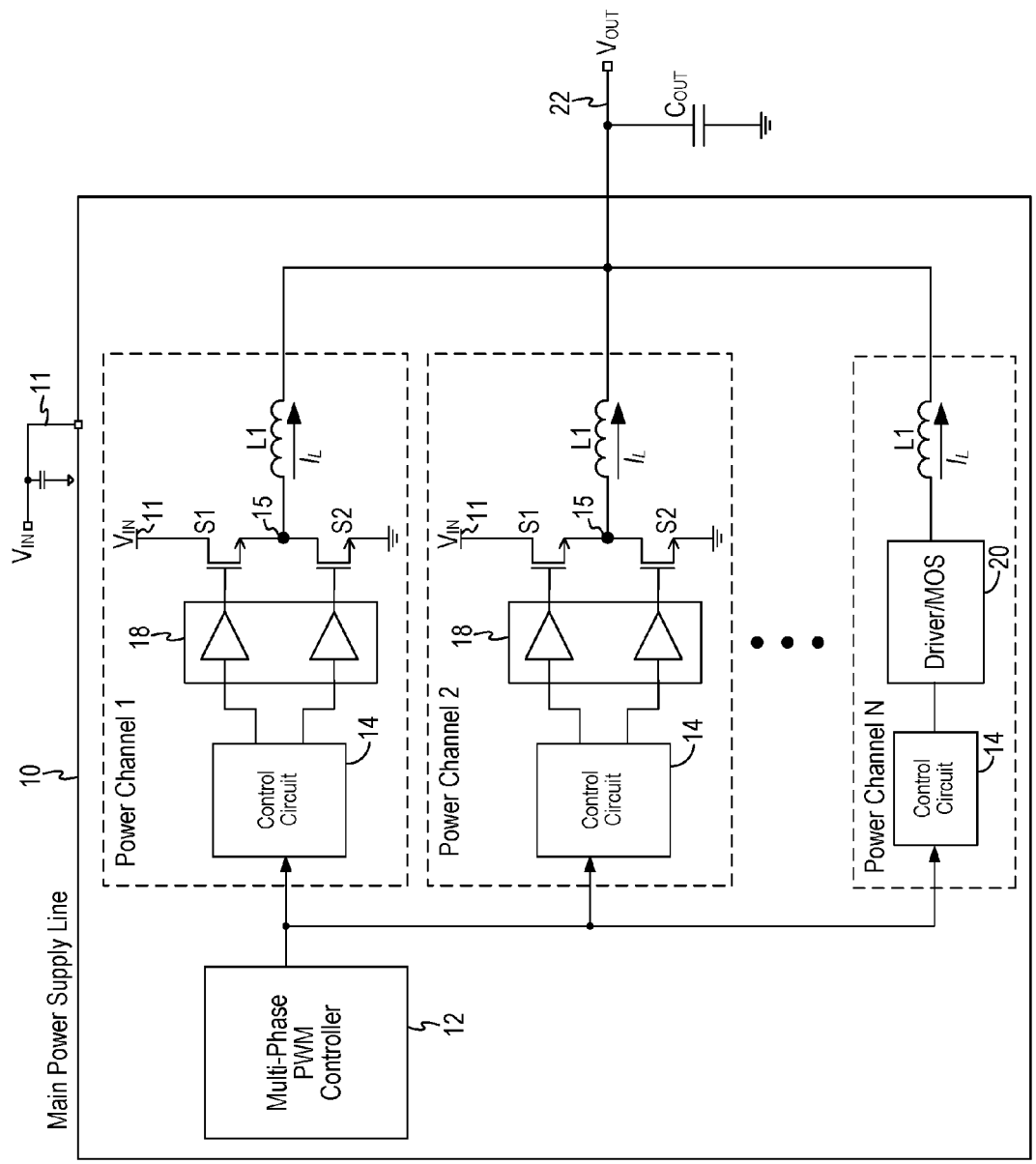
FIG. 2 is a schematic diagram of a conventional main line power supply.

FIG. 2 is a schematic diagram of a conventional main power supply line. Referring to FIG. 2, the main power supply line 10 receives an input DC voltage $V_{IN}$ (node 11) and generates an output voltage $V_{OUT}$ (node 22). The main power supply line 10 is typically configured to include multiple power channels (channel 1 to channel N). The power channels operate in different phases and are controlled by a multi-phase PWM controller 12. Each power channel includes a control circuit 14 receiving the PWM control signals from the controller 12. Each power channel further includes a driver circuit 18 driving a pair of MOS switches S1 and S2 as the high-side switch and the low-side switch. The control circuit 14 generates gate drive signals for the driver circuit 18 which then drives the MOS switches S1 and S2. The common node 15 between the switches S1 and S2 is coupled to an inductor L1. The output node of the inductor (node 22) of all the power channels are joined together and coupled to an output capacitor $C_{OUT}$ to generate the output voltage $V_{OUT}$. The power channel is configured as a buck converter. The operation of a buck converter to generate a switching signal at node 15 is well known and will be generalized as follows. The buck converter includes a pair of power switches S1 and S2 which are turned on and off to regulate an output voltage to be equal to a reference voltage. More specifically, the power switches are alternately turned on and off to generate a switching output voltage at the common node, also referred to as the switching output node. The switching output node is coupled to an LC filter circuit including an output inductor and an output capacitor to generate an output voltage having substantially constant magnitude. The output voltage can then be used to drive a load.

In particular, the high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

A common failure mode of the main line power supply is a short condition at the high-side power switch S1. However, when just a power switch in one power channel fails, the entire main power supply line is brought down and the redundant power supply is brought on-line to supply power until repair to the main power supply line can be performed.

In embodiments of the present invention, the fault tolerant power supply system provides an uninterrupted and continuous power flow without the need for a redundant or back up power supply system. When a redundant power supply system is eliminated, the OR'ing circuit and the associated control circuit are also eliminated. Accordingly, the fault tolerant power supply system of the present invention can be applied to provide an interrupted source of power with reduced system cost and reduced footprint. Importantly, the fault tolerant power supply system eliminates the inefficiency of using a redundant power supply that is dormant most of the time.

Figure 3:
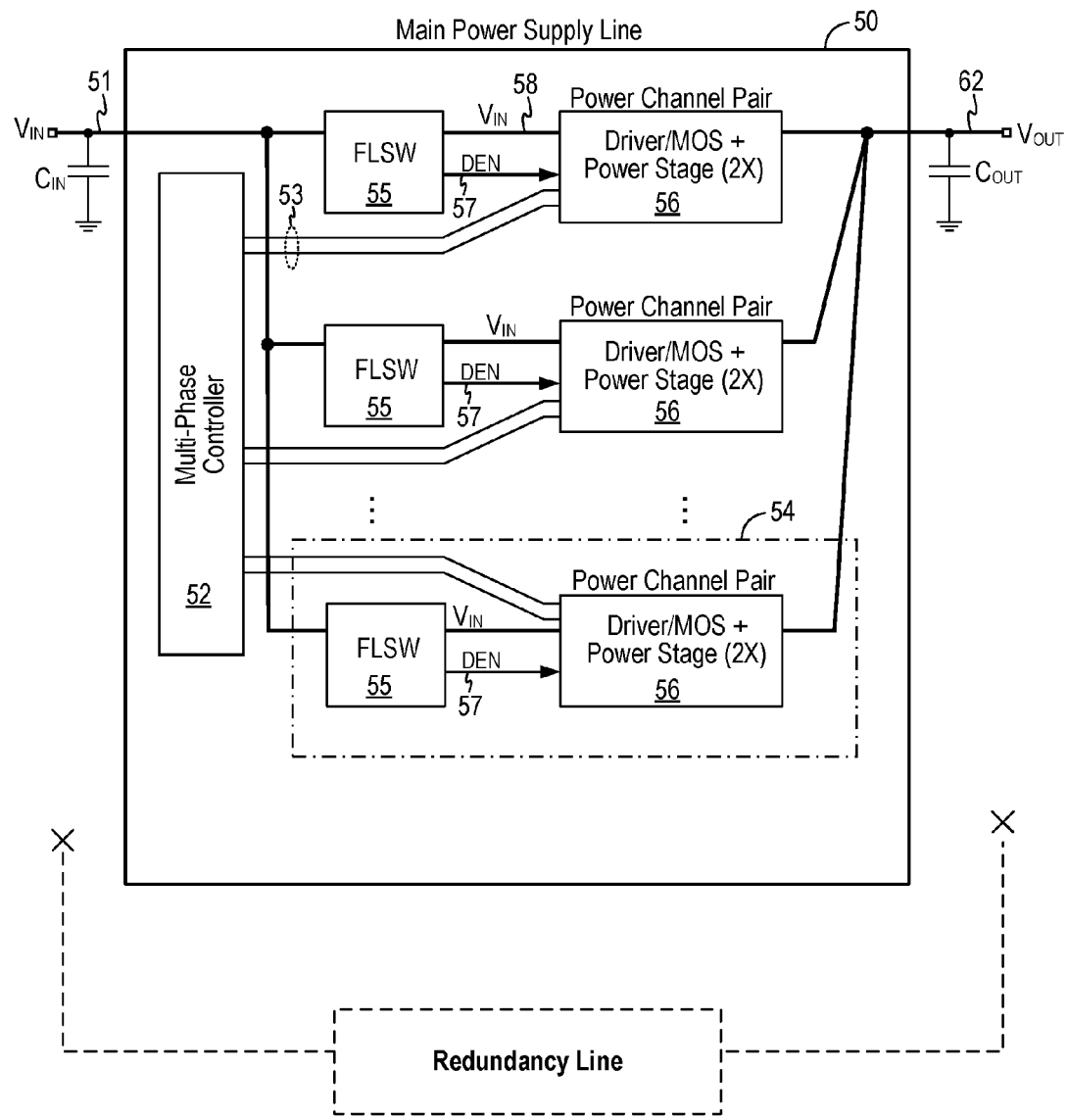
FIG. 3 is a schematic diagram of a fault tolerant power supply system in embodiments of the present invention.

FIG. 3 is a schematic diagram of a fault tolerant power supply system in embodiments of the present invention. Referring to FIG. 3, in the present illustration, the fault tolerant power supply system 50 ("power supply system 50") is applied in an application as the main power supply line to receive an input voltage $V_{IN}$ (node 51) and provide an output voltage $V_{OUT}$ (node 62). The input voltage $V_{IN}$ may be filtered by an input capacitor $C_{IN}$. The use of an input capacitor $C_{IN}$ at the input voltage node is optional and may be omitted in other embodiments of the present invention. The fault tolerant power supply system 50 includes N power channels where each power channel is configured as a buck converter and includes a driver circuit driving a high-side power switch and a low-side power switch. In the present embodiment, both the high-side and the low-side power switches are implemented using MOS transistors and are sometimes referred to as "high-side MOS switch" or "low-side MOS switch." In the present description, the combination of the driver circuit driving the high-side MOS switch and the low-side MOS switch is sometimes referred to as a gate driver/MOS switch circuit, or simply a "Driver/MOS circuit." In some applications, the Driver/MOS circuit is formed as a monolithic integrated circuit. Furthermore, in some embodiments, the low-side MOS switch and the high-side MOS switch are NMOS transistors.

The operation of a buck converter is well known and will be generalized as follows. The buck converter includes a pair of power switches S1 (high-side MOS switch) and S2 (low-side MOS switch) connected in series. The input voltage $V_{IN}$ is coupled to the drain terminal of the high-side MOS switch S1. The power switches S1 and S2 are turned on and off to regulate the output voltage $V_{OUT}$ to be equal to a reference voltage. More specifically, the power switches are alternately turned on and off to generate a switching output voltage at the common node, also referred to as the switching output node. The switching output node is coupled to an LC filter circuit including an output inductor and an output capacitor to generate an output voltage having substantially constant magnitude. The output voltage can then be used to drive a load. In the present description, only parts of the circuit elements of a buck converter relevant to the present invention are shown in the figures. It is understood that the power supply system and the buck converter may include other circuit elements or other control circuits not shown in the present figures to facilitate the normal operation of the power supply system and the buck converter in each power channel.

In the power supply system 50, the power channels operate in different phases and are controlled by a multi-phase controller 52, which can be a multi-phase PWM controller in some embodiments. The multi-phase controller 52 generates control signals 53, such as PWM control signals, which are coupled to each power channel to control the duty cycle of each power channel. In some embodiments, the power channels may have the same or different current rating. The power channels sum up to a common output voltage node 62 which generates the output voltage $V_{OUT}$ having a substantially constant magnitude over a range of load current conditions. When the output demands higher current, the multi-phase controller 52 adjusts the duty cycle of the PWM control signals 53 so that all power channels contribute evenly to the output. In some cases, the controller 52 may employ thermal and current balancing features, where the controller redistributes current sharing responsibilities to the phases or channels that are running cooler than the rest. In one embodiment, the fault tolerant power supply system 50 includes eight power channels. Each power channel supplies 20-30A to the output voltage node 62. The input voltage $V_{IN}$ can be 12V to 24V and the output voltage $V_{OUT}$ can be 1.2V to 5V.

In embodiments of the present invention, the fault tolerant power supply system 50 includes a set of intelligent load switch circuits 55 to connect to the power channels. In the present embodiment, each load switch circuit 55 is connected to a pair of power channels 56 (also "a power channel pair"). In particular, a power channel pair 56 includes two parallelly connected power channels where each power channel includes at least the driver circuit, the high-side MOS switch, the low-side MOS switch and the output inductor. In the present embodiment, each load switch circuit 55 is coupled to two power channels and form a power channel section 54. In other embodiments, the load switch circuit can be coupled to a single power channel or to two or more power channels. Furthermore, in the present embodiment, the load switch circuit 55 is configured as a fast turn-off load switch (FLSW) incorporating a rapid switch turn-off circuit to facilitate rapid turn-off of the load switch circuit when needed.

In the present embodiment, a load switch circuit 55 is connected in series between the input voltage $V_{IN}$ (node 51) and a power channel pair 56, in particular, to the input voltage node of the buck converter in each of the power channels. In operation, the load switch circuit 55 is turned on to couple the input voltage $V_{IN}$ to the drain terminal of the high-side MOS switches of the power channels. Each power channel generates a switching output voltage that is filtered by the inductor at the respective power channel and the output capacitor $C_{OUT}$ at the output voltage node 62. In the present embodiment, the output nodes of the power channels are connected together at the output voltage node 62 to a common output capacitor $C_{OUT}$. In other embodiments, each power channel or a group of power channels may be provided with an individual output capacitor. The exact configuration of the output capacitor $C_{OUT}$ at the output voltage node 62 is not critical to the practice of the present invention.

According to embodiments of the present invention, the power supply system 50 is implemented with intelligent load switch circuits. More specifically, a load switch circuit associated with one or more power channels incorporates fault detection capability and turns off the load switch circuit as well as the low-side MOS switch when a fault condition is detected. In most cases, a common fault condition in the power supply system 50 is a short circuit condition at the high-side MOS switch. When the high-side MOS switch is shorted, a direct path from the input voltage $V_{IN}$ to ground results when the low-side MOS switch is turned on, resulting in excessive current flowing through the power switches. The excessive current flow can lead to irreversible damage to the MOS switch circuits. In accordance with embodiments of the present invention, the load switch circuit detects an over-current condition at the load switch circuit and turns off both the load switch circuit and the low-side MOS switch of the Driver/MOS circuit to prevent further current flow.

In one embodiment, the load switch circuit 55 generates a fault signal when an over-current condition is detected which fault signal is used to turn off the load switch itself quickly to terminate the surge current flow. The load switch circuit further generates a fault flag signal. The fault flag signal is coupled to the Driver/MOS circuit as a disable signal (node 57) to disable or turn off the low-side MOS switch. In the present embodiment, a pair of power channels is disabled when the load switch is open or turned off by the fault detection at load switch circuit.

When a load switch 55 is turned off to disable one or more power channels due to fault detection by the load switch circuit, the multi-phase controller 52 adjusts the duty cycle of the PWM signals 53 provided to the other power channels so that the desired output voltage $V_{OUT}$ is maintained. In this manner, an uninterrupted output voltage and current flow is provided to the output voltage node 62. More importantly, the power supply system 50 can provide uninterrupted power without the need of a redundant power supply system as in the conventional configuration.

Figure 4:
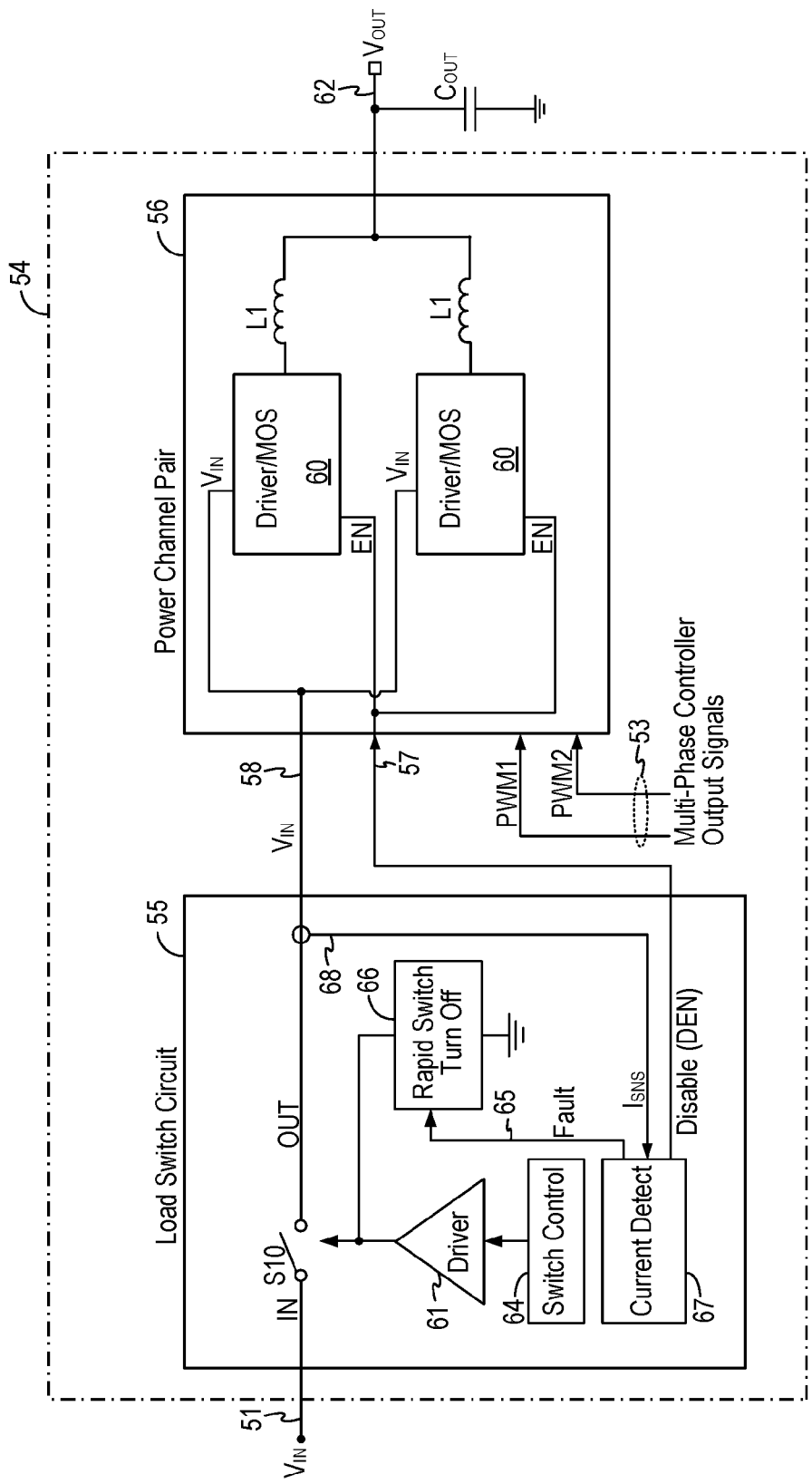
FIG. 4 is a schematic diagram illustrating the detail configuration of an intelligent load switch circuit coupled to a pair of power channels in embodiments of the present invention.

FIG. 4 is a schematic diagram illustrating a detail configuration of an intelligent load switch circuit coupled to a pair of power channels in embodiments of the present invention. Referring to FIG. 4, a power channel section 54 includes a load switch circuit 55 coupled to a power channel pair 56. The load switch circuit 55 connects the input voltage $V_{IN}$ (node 51) to the input voltage node of the MOS switches in each power channel. The input voltage node of the power channel is typically the drain terminal of the high-side MOS switch. More specifically, the load switch circuit 55 includes a main switch S10 with an input node IN connecting to the input voltage $V_{IN}$ (node 51) and an output node OUT connecting to the input voltage node (node 58) of the power channels in the power channel pair 56. When main switch S10 is closed, the power channels in the power channel pair 56 are connected to the input voltage $V_{IN}$. When the main switch 510 is open, the power channels are no longer connected to the input voltage $V_{IN}$. The main switch S10 is driver by a driver 61 under the control of a switch control circuit 64. Switch control circuit 64 is configured to turn on or off the main switch S10 based on control signals from the power supply system 50. In the present embodiment, the load switch 55 is a fast acting load switch and is capable of being turned off quickly when triggered. To that end, the load switch 55 includes a rapid switch turn-off circuit 66 configured to turn off the main switch S10 very quickly when triggered.

In embodiments of the present invention, the load switch circuit 55 further includes a current detect circuit 67 configured to detect an over-current condition at the load switch circuit. In particular, the current detect circuit 67 detects the current flowing in the main switch S10 of the load switch circuit. In one embodiment, the current detect circuit 67 senses the current at the output node OUT of the main switch S10. For example, the current detect circuit 67 may receive a sense current $I_{SNS}$ (node 68) indicative of the current at the OUT node of the main switch S10. In an alternate embodiment, the current detect circuit 67 senses the current flowing through main switch S10, that is across the input node IN and output node OUT of main switch S10. The current detect circuit 67 generates a fault signal (node 65) which is asserted when the current flowing through main switch S10 exceeds a given threshold. The fault signal (node 65) is coupled to the rapid switch turn-off circuit 66 to activate the switch turn-off circuit to turn off main switch S10 quickly in response to the detected over-current condition. In particular, the rapid switch turn-off circuit 66, when triggered by the fault signal (node 65), opens or turn off main switch S10 quickly so as to terminate the connection between the input node IN and the output node OUT of the main switch S10. As a result, the input voltage node 58 of the power channels is no longer connected to the input voltage $V_{IN}$ (node 51). The current detect circuit 67 is further configured to generate a fault flag signal (node 57) which is coupled to the Driver/MOS circuits 60 as a disable signal to turn off the low-side MOS switch of the power channel, as will be explained in more detail below.

In the power channel pair 56, each power channel includes a gate driver/MOS switch circuit 60 and an inductor L1. The output nodes of the pair of power channels are coupled to the output voltage node 62 to which the output capacitor $C_{OUT}$ is coupled. The power channels in the pair 56 operate under the control of PWM control signals 53 from the multi-phase controller 52 at specific duty cycles. The Driver/MOS circuit 60 in each power channel pair 56 is enabled by an Enable signal (EN). In accordance with embodiments of the present invention, the intelligent load switch circuit 55 generates a fault flag signal which is used as a disable signal (DEN) (node 57) coupled to the Enable signal terminal of the Driver/MOS circuit 60. When a surge current, or a current exceeding a certain threshold, is detected at the load switch circuit, the intelligent load switch circuit 55 turns off at least the low-side MOS switch of the Driver/MOS circuit and/or put the low-side MOS switch in a tri-state mode. In some embodiments, the disable signal DEN (node 57) is coupled to the Driver/MOS circuit 60 to turn off both the high-side MOS switch and the low-side MOS switch and/or to put the high-side and low-side MOS switches in a tri-state mode.

Accordingly, the load switch circuit 55 operates to decouple a problematic power channel from the power supply system so that the power supply system can continue to operate using the remaining power channels to provide uninterrupted power to the output voltage node. In this manner, the power supply system 50 of the present invention implements fault tolerant design which enables the power supply system to continue operation, rather than failing completely, when a power channel of the system fails.

In embodiments of the present invention, the power channels in the fault tolerant power supply system 50 are formed as interchangeable components or are swappable so that a failed power channel can be swapped out while the rest of the power channels continue normal operation. In some embodiments, the Driver/MOS circuit of a power channel is formed as a swappable module. When a power channel fails due to a faulty high-side MOS switch, such as a shorted high-side MOS switch, the Driver/MOS circuit module can be swapped out while the remaining power channels supply the necessary power to the output voltage node. The power supply system 50 continues normal operation while the faulty Driver/MOS circuit is being replaced. The replaced driver/MOS circuit module, once installed, can be powered up, such as by a soft-start operation, to the operating voltage before the replacement power channel is brought back on-line. The multi-phase controller 52 of the power supply system 50 monitors the output voltage $V_{OUT}$ and adjusts the phase of the PWM signals provided to each power channel to generate the desired output voltage value.

In some embodiments, the intelligent load switch circuit generates a fault flag signal which is provided as an output signal of the power supply system where the fault flag is used to alert the operator of the power supply system of a faulty power channel.

Figure 5:
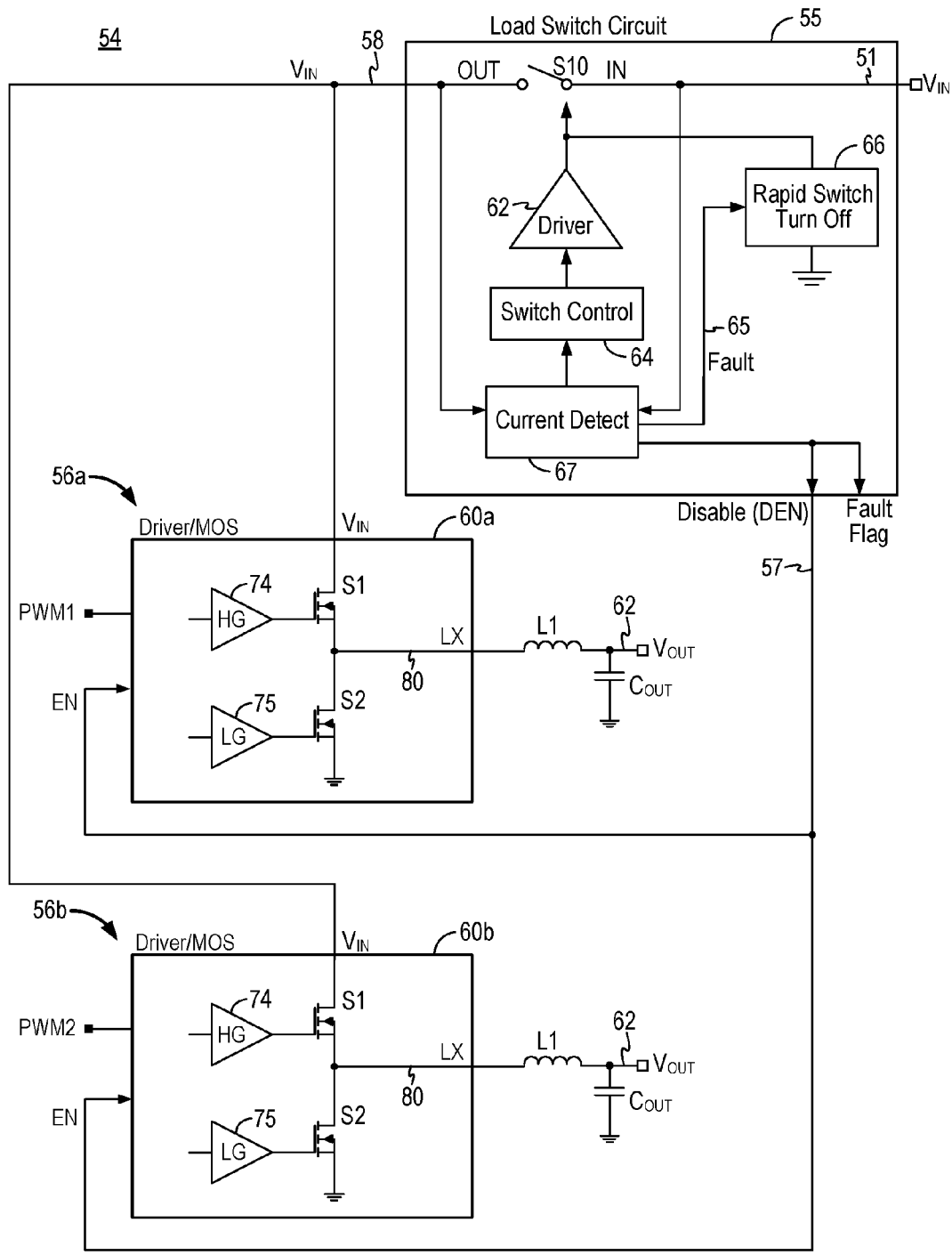
FIG. 5 is a schematic illustrating the circuit configuration of an intelligent load switch circuit coupled to a pair of power channels in embodiments of the present invention.

FIG. 5 is a schematic illustrating the circuit configuration of an intelligent load switch circuit coupled to a pair of power channels in embodiments of the present invention. In the present embodiment, each power channel is configured as a buck converter. The power channels in a power channel pair are configured in identical manner and description of one power channel is applicable to the other power channel. Referring to FIG. 5, a power channel section 54 includes a load switch circuit 55 coupled to a pair of power channels 56a, 56b.

In the present embodiment, the load switch circuit 55 is configured in a similar manner as the load switch circuit in FIG. 4 and described above and description of the load switch circuit 55 will not be repeated here. In brief, the load switch circuit 55 connects or decouples the input voltage $V_{IN}$ (node 51) to the input voltage node 58 of the power channels 56a, 56b. In the embodiment shown in FIG. 5, the current detect circuit 67 senses the current across the input node IN and output node OUT of main switch S10 to measure the current flowing across the main switch S10. In other embodiments, the current detect circuit 67 can sense the current at the output node OUT of main switch S10, as shown in FIG. 4.

In the present embodiment, a power channel 56a includes a Driver/MOS circuit 60a and an inductor L1 configured as a buck converter. The power channel 56a is connected to the output voltage node 62 to an output capacitor $C_{OUT}$. The output capacitor $C_{OUT}$ is typically a common output capacitor shared by all power channels or a group of power channels. The Driver/MOS circuit 60a may include a driver circuit (not shown) receiving a PWM control signal PWM1 and an Enable signal for the power channel. The driver circuit generates control signals for the high-side gate driver 74 and the low-side gate driver 75. The high-side gate driver 74 is configured to drive the gate of the high-side MOS switch S1 while the low-side gate driver 75 is configured to drive the gate of the low-side MOS switch S2. The common node 80 between the high-side MOS switch S1 and the low-side MOS switch S2 is the switching output node LX and is coupled to one terminal of the inductor L1. The other terminal of the inductor L1 is coupled to the common output voltage node 62 for the power supply system 50. The output capacitor $C_{OUT}$, which may be a common output capacitor for one or more or all power channels, is also coupled to the output voltage node 62. The control circuitry in the Driver/MOS circuit 60a, may have many circuit arrangements known in the art.

In a buck converter, the high-side MOS switch S1 and the low-side MOS switch S2 are controlled by the high-side gate driver 74 and the low-side gate driver 75, such that only one MOS switch is turned on at a time and both MOS switches are prevented from being turned on at the same time. Thus, in normal operation, there is no direct current path between the input voltage $V_{IN}$ (node 58) and ground. However, when the high-side MOS switch S1 is shorted out, a large surge current results when the low-side MOS switch S2 is turned on, creating a direct current path from input voltage $V_{IN}$ to ground. So when the high-side MOS switch S1 is shorted, the large surge current occurs when the high-side MOS switch S1 is turned off and the low-side MOS switch S2 is turned on. The intelligent load switch circuit of the present invention senses this surge current at the load switch circuit to detect the fault condition at a power channel and to initiate over-current protection operation.

Conventional power supply systems sometimes employ conventional load switches to in series with the input voltage. In some cases, the load switch is left to withstand and sustain large amount of current during a short circuit event that ultimately leads to system catastrophic failure. Some conventional load switches include current limiting features that alert and trigger shutdown functions but the process of shutting down the load switch (or "opening" the switch) typically took a fairly long time to complete, for example, hundreds of micro-seconds. The power supply system may be irreparably damaged by the time the load switch is open in response to a current limiting event.

Some conventional load switches are designed with current clamping features where the internal control network of the load switch triggers a fixed maximum current level that cannot be exceeded to prevent further damage in the system. However, a current clamping load switch cannot be applied in multi-phase/multi-channel power supply system because the current clamping feature will disrupt the output voltage.

In embodiments of the present invention, the fault tolerant power supply system incorporates an intelligent load switch circuit having over-current detection and fast turn-off capability. In one embodiment, the load switch circuit has an overall turn off time in the nano-seconds range, for example, approximately 100 ns (over temperature variations). The turn off time refers to the time period from when a fault condition is detected to when the load switch is completely turned off. In general, the load switch circuit incorporated in the power supply system of the present invention has an overall turn off time short enough to avoid peak current from being developed to cause components of the power supply system to exceed their thermal limits. In other words, the load switch is capable of rapid response so as to avoid excessive peak current being developed and thereby damaging the power supply system. In particular, the rapid and expedient de-coupling of a failed power channel operates to mitigate and minimize peak current build up that is generated by the parasitic inductance and capacitance residing alongside the buck converter where the peak current build up can be damaging to other power channels and other circuitry of the power supply system.

Referring to FIG. 5, the intelligent load switch circuit 55 senses the current at the main switch of the load switch circuit, such as by measuring the current level at the output node OUT of the main switch S10 or measuring the current across the input and output nodes (IN and OUT) of the main switch S10. When the sensed current at main switch S10 exceeds an over-current limit threshold (i.e., an over-current condition is detected), the current detect circuit 67 generates a fault signal (node 65) to the rapid switch turn-off circuit 66 to turn off the main switch S10, thereby turning off the load switch circuit 55. In the load switch circuit 55, the switch control circuit 64 is used to turn on the main switch S10, such as during soft-start. Because the main switch S10 is a large device, the rapid switch turn-off circuit 66 includes a large driver to be able to turn-off the main switch S10 quickly. In one embodiment, the rapid switch turn-off circuit 66 includes an active pull-down device. In some embodiments, the rapid switch turn-off circuit 66 is an NMOS transistor configured to pull-down on the gate of the main switch S10 to turn off the load switch. The rapid switch turn-off circuit 66 is capable of turning off the load switch quickly before irreparable damages occur to the power supply system.

Meanwhile, the fault signal is also coupled outside of the load switch circuit 55 as a fault flag signal. In one embodiment, the fault signal (node 65) is an active high signal and the load switch circuit 55 generates a fault flag signal (node 57) being an active low signal. That is, the fault flag signal has a logical low state to indicate a fault or over-current condition. The fault flag signal (node 57) is coupled to the Driver/MOS circuit 60 as the Enable signal. The fault flag signal (node 57) is used as a driver disable signal (Disable or DEN) to turn off the high-side MOS switch and the low-side MOS switch in the Driver/MOS circuit 60 and put the MOS switches in a tri-state mode. The Disable signal may further be used to disable other circuitry in the Driver/MOS circuit or the power channel.

In this manner, when there is a short-circuit condition at the high-side MOS switch S1 of a power channel, the intelligent load switch circuit 55 senses the surge current when the low-side MOS switch is turned on and is able to turn off the load switch circuit quickly to avoid damage to other parts of the power supply system. In one embodiment, the over-current detection, fault recognition and load switch turn-off operation are deployed within a short time duration, such as within 100 ns.

Figure 6:
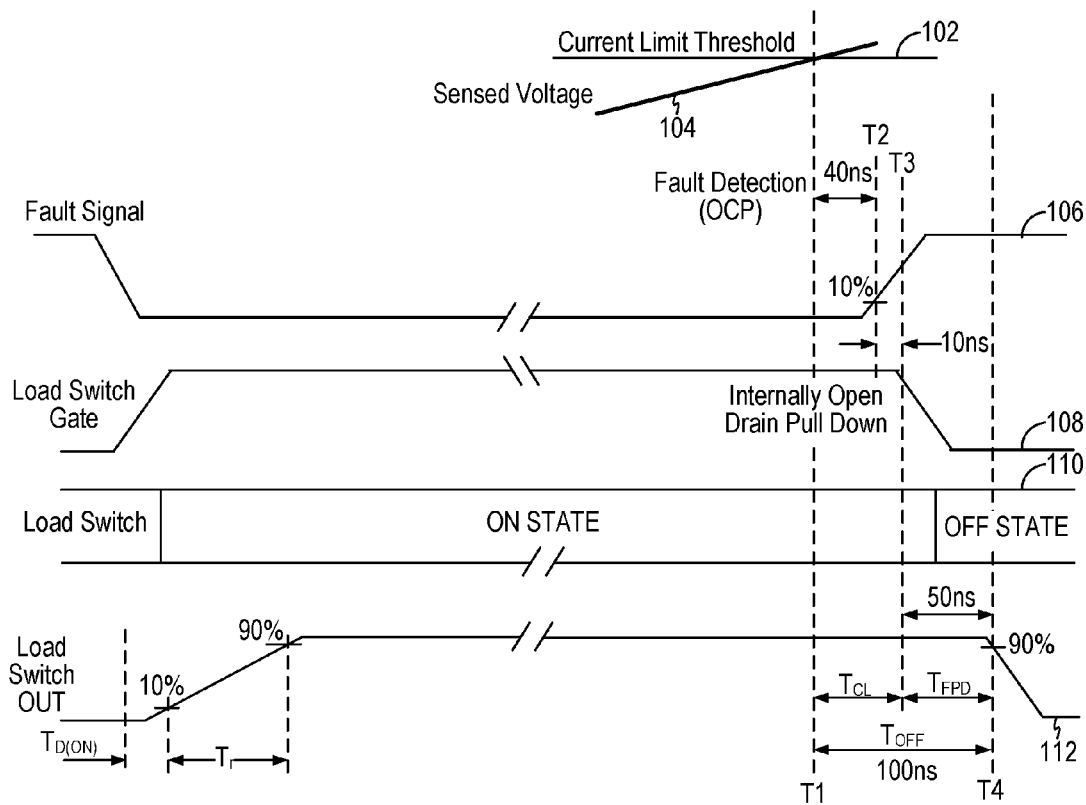
FIG. 6 is a timing diagram illustrating the operation of the intelligent load switch circuit in an example of the present invention.

FIG. 6 is a timing diagram illustrating the operation of the intelligent load switch circuit in an example of the present invention. Referring to FIG. 6, curve 102 denotes the over-current limit threshold and curve 104 denotes a sensed voltage value indicative of the current flowing in the main switch S10 of the load switch circuit. Curve 106 denotes the fault signal generated in response to an over-current condition and is an active high signal in the present embodiment. Curve 108 denotes the gate signal to the main switch S10 of the load switch circuit. Curve 110 denotes the on or off state of the load switch. Curve 112 denotes the OUT node of the load switch.

In normal operation, the fault signal is not asserted and is thus at a logical low level. The gate signal to the main switch S10 of the load switch circuit is asserted to turn on main switch S10 (curve 108) to connect the input voltage $V_{IN}$ to the Driver/MOS circuit. The load switch is thus turned on (ON-State) (curve 110). The load switch may be turned on through a soft-start operation such that the output node OUT node rises slowly to the full input voltage $V_{IN}$ (curve 112). When the output node OUT of the load switch is fully powered up, the power channels can start operation.

However, in the event that there is a short-circuit condition at the high-side MOS switch, when the low-side MOS switch is turned on, the sensed voltage increases (curve 104). At time T1, the sensed voltage exceeds the over-current limit threshold (curve 102). As a result of the sensed voltage exceeding the over-current limit threshold, at time T2, the fault signal in the intelligent load switch circuit is asserted high (curve 106). With the detection of the fault condition, at time T3, the fault signal causes the main switch S10 to turn off. More specifically, the gate signal to the main switch S10 is deasserted at time T3 (curve 108). Because the load switch is typically a large device, a certain amount of time is required to turn off the load switch. At time T4, the load switch is finally turned off and the load switch output signal OUT finally decreases, indicating that the input voltage $V_{IN}$ has been decoupled from the load switch OUT node. In the present illustration, the time $T_{OFF}$ from detection of the fault condition (T1) to the turning off of the load switch (T4) is about 100 ns which ensures that no irreparable damage is done to the power supply system.

In the present embodiment, with the detection of the fault condition and the assertion of the fault signal at time T2, the fault flag signal (not shown) is also asserted to cause at least the low-side MOS switch to turn off in the Driver/MOS circuit.

Figure 7:
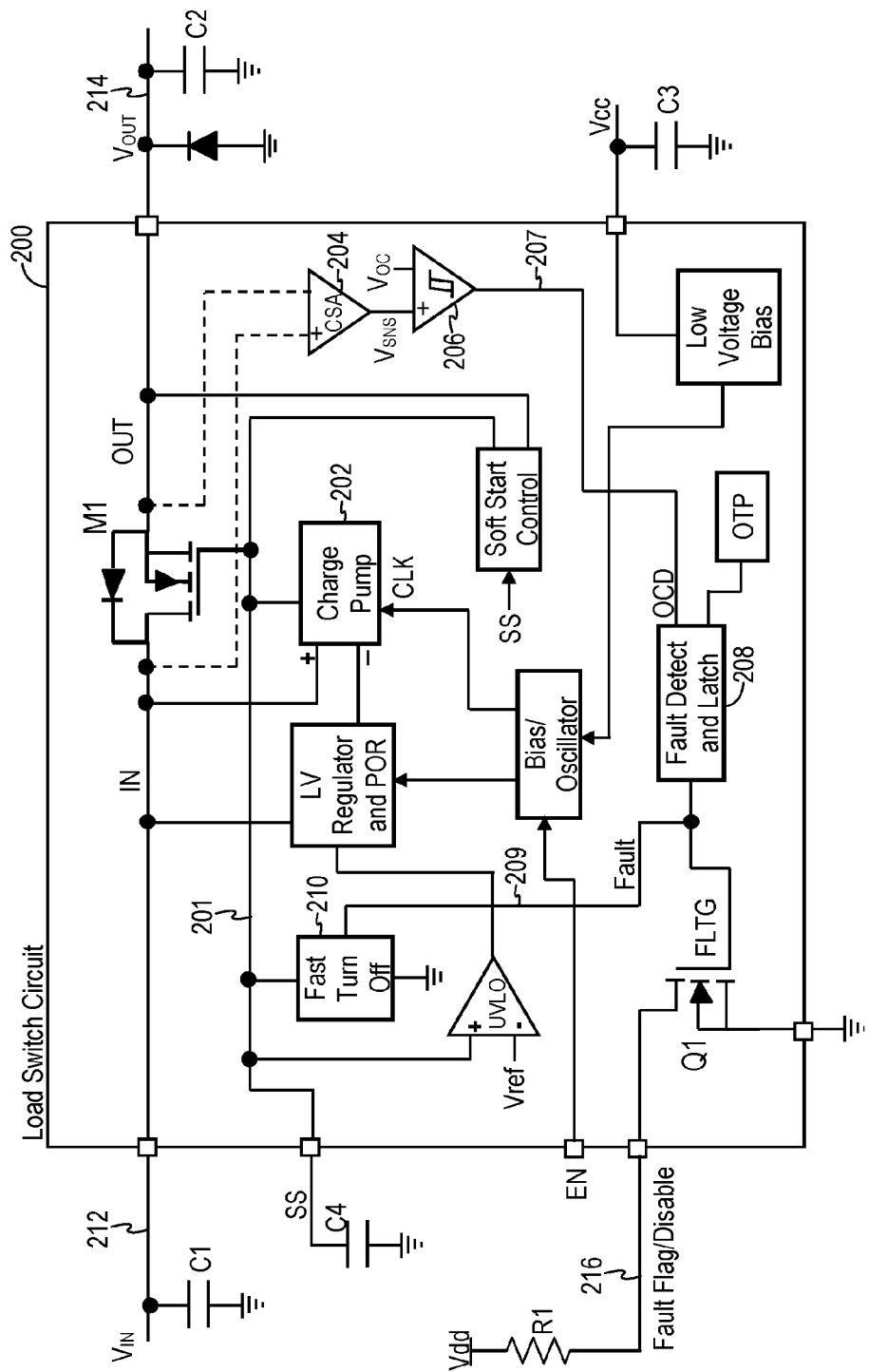
FIG. 7 is a schematic diagram illustrating a fast acting load switch circuit in embodiments of the present invention.

FIG. 7 is a schematic diagram illustrating a fast acting load switch circuit in embodiments of the present invention. Referring to FIG. 7, in embodiments of the present invention, the fast acting load switch circuit 200 is constructed using an NMOS transistor M1 as the main switch, that is as the main switch S10 in FIG. 4 and FIG. 5. Furthermore, in embodiments of the present invention, the gate terminal of the NMOS transistor M1 is coupled to a floating power rail 201 and is driven by a charge pump circuit 202. When the NMOS transistor M1 is to be turned on, the charge pump circuit 202 drives the gate of the NMOS transistor M1 to a given voltage above the source/drain terminals of the NMOS transistor M1 to ensure that the NMOS transistor is fully on to transfer the input voltage $V_{IN}$ on the input node 212 (IN) to the output node 214 (OUT) fully. That is, the gate terminal of the NMOS transistor M1 is driven by the charge pump circuit 202 to be above the voltage levels at the input or output nodes 212, 214 when the transistor M1 is to be turned on. For example, when the input voltage $V_{IN}$ is 12V and the NMOS transistor M1 as the main switch is to pass this 12V to the output node OUT, the gate of the NMOS transistor M1 is driven by the charge pump to 17V to ensure that the NMOS transistor M1 is fully on to pass the 12 voltage from the drain to the source terminal of the NMOS transistor. An NMOS transistor as the main switch M1 in the load switch circuit has advantages over a PMOS transistor main switch in that NMOS transistors have lower on-resistance and smaller gate capacitance and can be turned off faster than PMOS transistors.

In the present embodiments, the load switch circuit 200 includes a fast turn-off circuit 210 as the rapid switch turn-off circuit in FIG. 4 and FIG. 5. In some embodiments, the fast turn-off circuit 210 is an active pull-down device to pull down the gate terminal of the NMOS transistor M1 to turn the transistor off. In some embodiments, the active pull-down device is a large size driver to be able to pull down on the gate terminal of the NMOS transistor M1 quickly. The fast turn-off circuit 210 is triggered by a fault signal 209 in response to a fault signal (node 209) generated from the current detect circuit of the load switch circuit 200 indicating an over-current condition at the load switch is detected.

FIG. 7 illustrates one embodiment of the current detect circuit incorporated in the load switch circuit 200 for detecting an over-current condition at the load switch. In the present embodiment, the current detect circuit includes a current sense amplifier (CSA) 204 coupled across the source and drain terminal of the main switch M1 to detect for the presence of a large surge current and a comparator 206 configured to compare the sensed voltage signal to a threshold level. In particular, the current sense amplifier 204 detects the current value of the current flowing across the MOS transistor M1. The current sense amplifier 204 generates an output voltage signal $V_{SNS}$ indicative of the sensed current value across the NMOS transistor M1. The sensed voltage signal $V_{SNS}$ is coupled to the positive input terminal of the comparator 206 to be compared with a threshold voltage $V_{OC}$ coupled to the negative input terminal of the comparator 206. The threshold voltage $V_{OC}$ represents the over-current threshold limit for the power supply system. The comparator 206 generates an over-current detect (OCD) signal (node 207) as the comparator output signal When the sensed voltage signal $V_{SNS}$ is less than the threshold voltage $V_{OC}$ indicating that the current at the NMOS transistor main switch M1 is lower than the over-current threshold limit, the output signal of the comparator 206 is deasserted or at a logical low. When the current at the main switch M1 exceeds the over-current threshold limit, that is, an over-current condition is detected, the comparator 206 asserts the over-current detect (OCD) signal (node 207) to a logical high. The over-current detect signal (node 207) may be coupled to a fault detect and latch circuit 208 to generate a fault signal (node 209) which is coupled to the fast turn-off circuit 210 to turn off the NMOS transistor main switch M1. The fault signal (node 209) may be an active high signal. In other embodiments, the fault detect and latch circuit 208 may be omitted and the output signal (OCD) of the comparator 206 may be used as the fault signal.

Meanwhile, the fault signal is used to generate a fault flag signal which is used to as the Disable signal t0 disable at least the low-side MOS switch in the Driver/MOS circuit. In the present embodiment, the fault flag signal is an active low signal generated by an open-drain NMOS transistor Q1. More specifically, in load switch circuit 200, the fault signal (node 209) is coupled to the gate of the open-drain NMOS transistor Q1. When the fault signal (node 209) is asserted, the NMOS transistor Q1 is turned on to pull down on the drain node 216 of the transistor Q1, thereby generating the fault flag signal being an active low signal. The drain node 216 of the transistor Q1 provides the fault flag signal which is coupled to the Driver/MOS circuit as the Disable signal to turn off at least the low-side MOS switch.

The load switch circuit 200 may include other circuit elements to support the normal operation of the load switch, such as soft start control. The other circuit elements shown in FIG. 7 for the normal operation of the load switch circuit are not critical to the practice of the present invention and may be omitted or may have other circuit arrangements in other embodiments.

The fault tolerant power supply system of the present invention provides many advantages. First, the redundancy or back-up power system is eliminated in a power system requiring uninterrupted power. Eliminating the back-up power system results in significant cost and physical space savings. Instead of using a back-up power system, the main power line can be implemented using the fault tolerant power supply system of the present invention which incorporate intelligent load switch circuits on a set of power channels.

Second, configuring the intelligent load switch circuit at the input of each power channel pair prevents total system failure on the main line. The main line power system is now equipped with a mechanism that electrically disconnects the problematic power channel from the rest of the system before irreparable damages occur.

Third, in some embodiments, the fault tolerant power supply system of the present invention raises a fault flag after an over-current condition is detected and uninterrupted power flow continues. This fault flag can be immediately sent out as disable signals to the troubled Driver/MOS circuit to tri-state the MOS switches and other sub-circuitry that require necessary disabling. The fault flag can be used to alert the system or a user of the problematic power channel.

Finally, the fault tolerant power supply system of the present invention can be implemented with swappable power channel components to enable the power supply system to be repaired while the system remains in full operation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method in a power supply system, the power supply system receiving an input voltage and generating an output voltage on an output voltage node, the method comprising:
   providing a load switch circuit configured to connect, using a main switch, the input voltage to an output node of the load switch circuit in response to the load switch circuit being turned on;
   providing two or more power channels, each power channel coupled to the load switch circuit to receive the input voltage at the output node of the load switch circuit and each power channel coupled to the output voltage node of the power supply system to provide the output voltage, each power channel being configured as a buck converter and including at least a high-side power switch and a low-side power switch connected in series and an output inductor;
   enabling the main switch of the load switch circuit to connect the input voltage to the output node of the load switch circuit;
   measuring a current flowing through the main switch of the load switch circuit;
   determining that the current flowing through the main switch of the load switch circuit has exceeded a current limit threshold; and
   disabling the main switch of the load switch circuit in response to the determining and disabling the low-side power switch of each of the two or more power channels in response to the determining.

2. The method of claim 1, wherein enabling the main switch of the load switch circuit to connect the input voltage to the output node of the load switch circuit comprises:
   turning on the main switch to connect the input voltage to the output node of the load switch circuit.

3. The method of claim 2, wherein disabling the main switch of the load switch circuit comprises:
   turning off the main switch in response to the determining to disconnect the input voltage from the output node of the load switch circuit.

4. The method of claim 3, wherein turning off the main switch in response to the determining comprises:
   turning off the main switch in response to the determining within a time duration to avoid damage to the power supply system.

5. The method of claim 3, wherein turning off the main switch in response to the determining comprises:
   turning off the main switch in response to the determining within a time duration in the nano-seconds range.

6. The method of claim 1, wherein the main switch of the load switch circuit further comprises a main switch input node coupled to the input voltage and a main switch output node being the output node of the load switch circuit and wherein measuring a current flowing through the main switch of the load switch circuit comprises measuring a current at the main switch output node as the current flowing through the main switch.

7. The method of claim 1, wherein the main switch of the load switch circuit further comprises a main switch input node coupled to the input voltage and a main switch output node being the output node of the load switch circuit and wherein measuring a current flowing through the main switch of the load switch circuit comprises measuring a current flowing across the main switch input node and the main switch output node as the current flowing in the main switch.

8. The method of claim 3, wherein the main switch of the load switch circuit further comprises a main switch input node coupled to the input voltage, a main switch output node being the output node of the load switch circuit, and a control terminal; and wherein turning off the main switch in response to the determining to disconnect the input voltage from the output node of the load switch circuit comprises:
   turning off the main switch by driving the control terminal of the main switch in response to the determining to disconnect the input voltage from the output node of the load switch circuit.

9. The method of claim 8, wherein the main switch comprises a first NMOS transistor having a drain terminal as the main switch input node, a source terminal as the main switch output node and a gate terminal as the control terminal; and the method further comprising:
   driving the gate terminal of the first NMOS transistor to a voltage value greater than a voltage value at the drain and source terminals of the first NMOS transistor in response to the main switch being turned on.

10. The method of claim 9, wherein turning off the main switch in response to the determining to disconnect the input voltage from the output node of the load switch circuit comprises:
    driving the control terminal of the main switch using a second NMOS transistor to pull down on the control terminal of the main switch to turn off the main switch in response to the determining.

11. The method of claim 1, further comprising:
    disabling the high-side power switch of each of the two or more power channels in response to the determining.

* * * * *